United States Patent [19]

Ihlow

[11] Patent Number: 4,545,297
[45] Date of Patent: Oct. 8, 1985

[54] ONION PEELING DEVICE

[76] Inventor: Rolf Ihlow, Dresdner Str. 24a, D-3201 Holle, Fed. Rep. of Germany

[21] Appl. No.: 634,632

[22] Filed: Jul. 26, 1984

[30] Foreign Application Priority Data

Sep. 24, 1983 [DE] Fed. Rep. of Germany ....... 3334659

[51] Int. Cl.⁴ .............................................. A23N 7/00
[52] U.S. Cl. ...................................... 99/586; 30/299; 99/587; 99/591
[58] Field of Search ................................. 99/539–541, 99/567, 584, 586, 587, 588–592, 595; 30/299; 130/9 R, 9 A

[56] References Cited

U.S. PATENT DOCUMENTS

| | | | |
|---|---|---|---|
| 1,137,841 | 5/1915 | Cookson | 99/586 |
| 1,237,251 | 8/1917 | Lyng | 99/586 |
| 2,396,444 | 3/1946 | Singer | 99/590 X |
| 3,696,848 | 10/1972 | Mellon et al. | |

FOREIGN PATENT DOCUMENTS 58433 2/1941 Denmark ............................... 99/591

Primary Examiner—Timothy F. Simone
Attorney, Agent, or Firm—Wells & Wells

[57] ABSTRACT

An onion peeling device is created by means of which a substantial number of onions can be peeled one immediately after the other in simple and sanitary but also precise manner.

An onion rest is provided, further pivot arms circularly arranged on a support plate with a clearance, where the support plate and the clearance can be guidably displaced above the onion rest and where the pivot arms are drawn toward each other by spring means and include heads pointing toward the center of the clearance, the spacing of the heads formed by stop means corresponding in the initial condition to the average onion cross-section in the area of the cut-off onion blossom, the heads being provided with slitting knives located in the plane of rotation and stripper means extending approximately tangentially to the onion cross-section.

22 Claims, 6 Drawing Figures

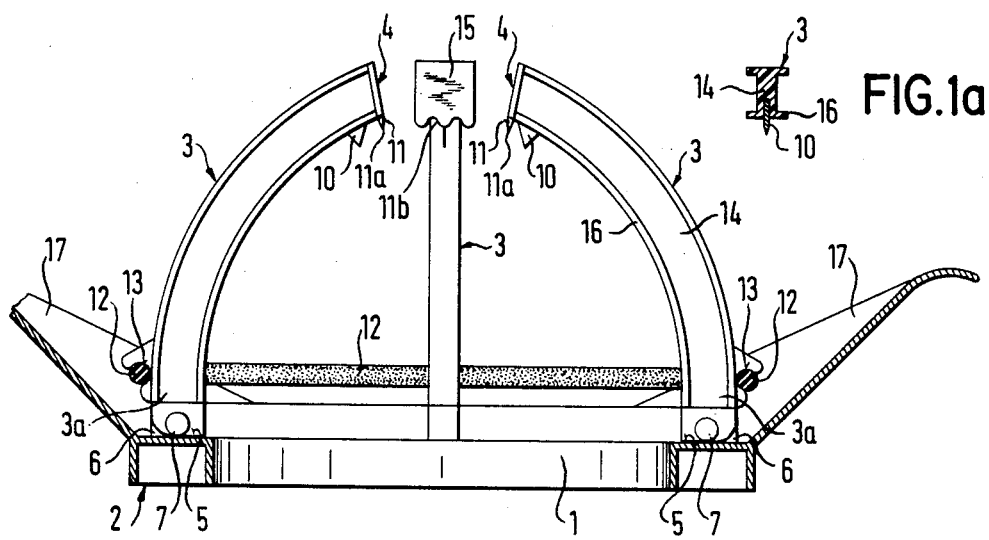
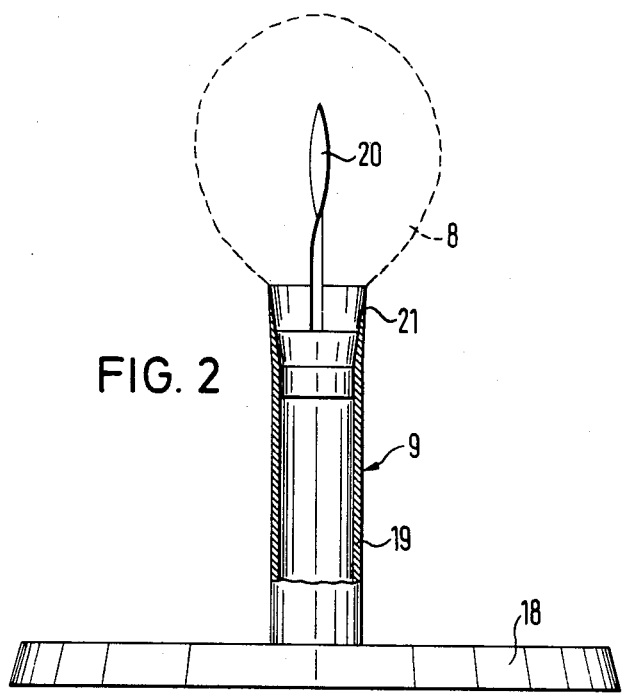

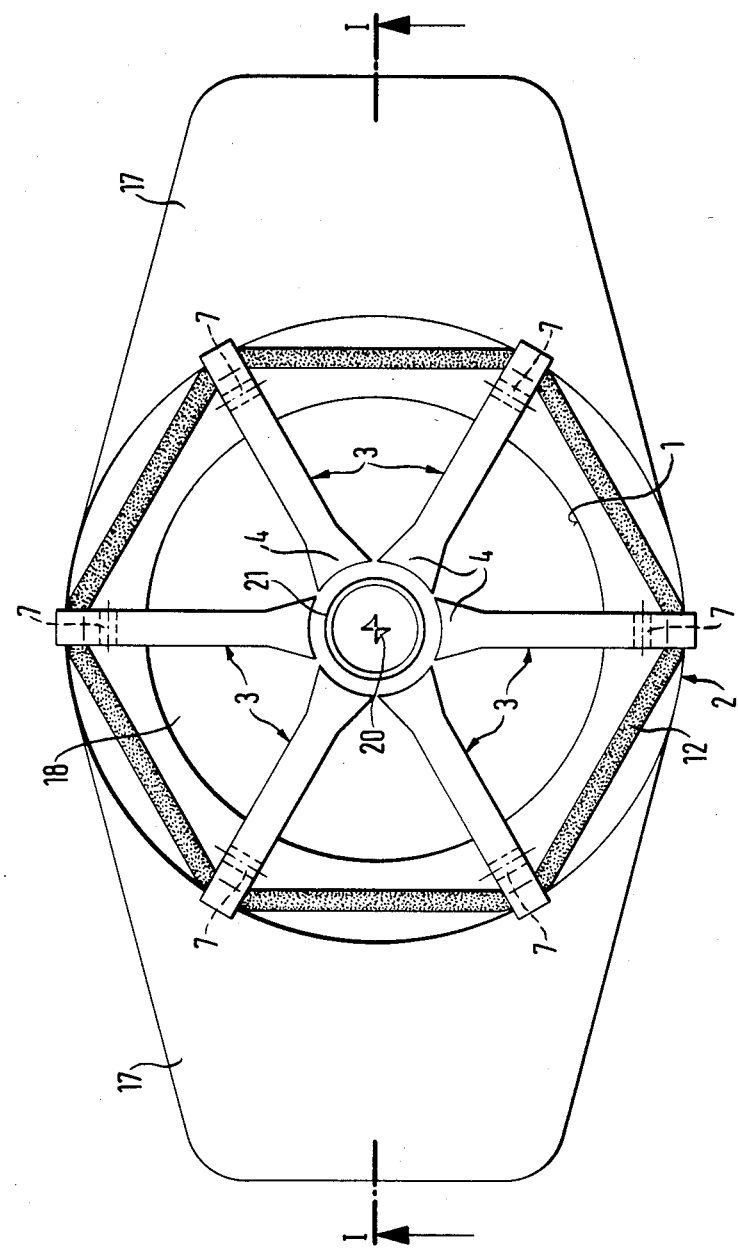

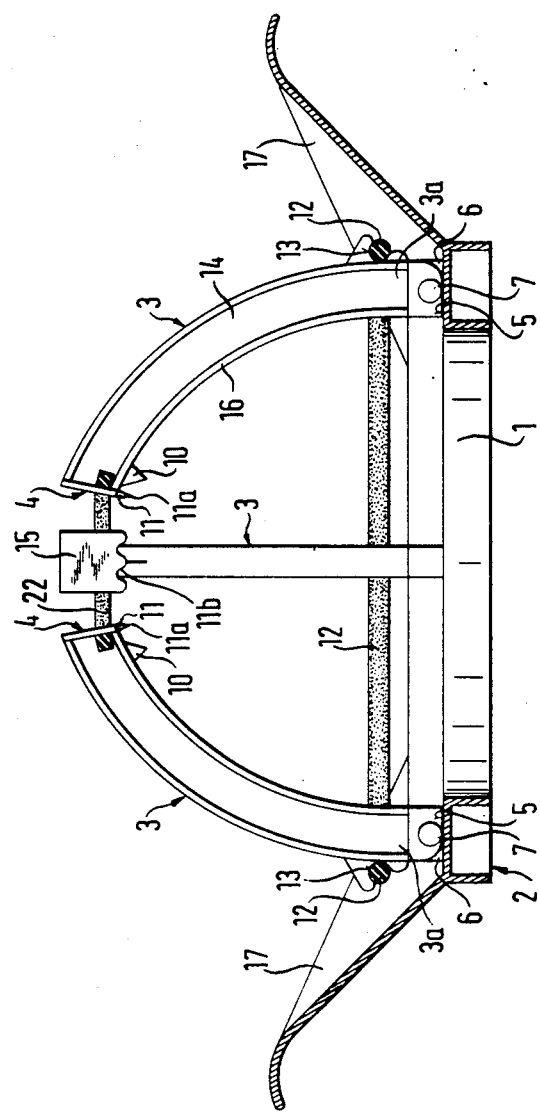

ONION PEELING DEVICE

BACKGROUND OF THE INVENTION

The invention concerns a device for peeling onions.

Known devices for peeling onions consist of simple knives which may be provided with notches at the cutting edge, the onions being peeled by using these knives to cut the onion skin in the conventional peeling manner and then pulling it off the onion body.

As a rule only the outer hard onion skin is considered in peeling, the onion thus peeled then being processed further, for instance by being cut to size.

This manual procedure suffers from the drawback that it takes a fairly long time to rid the onion of its outer skin. Also, the onion peeler cries and there is a loss of aroma due to heating the onion by the hands of the peeler.

Accordingly the known peeling method is especially in need of improvement where a large number of onions must be rid of their skins.

SUMMARY OF THE INVENTION

It is therefore the object of the present invention to create an onion peeling device avoiding the drawbacks of the manual method and making it possible to peel in simple and sanitary but also precise manner a large number of onions, one directly after the other.

This problem is solved by the present invention by providing a rest for the onion, this rest comprising mutually spring-tensioned pivot arms circularly arranged on a support plate with a clearance guided together with that clearance above the onion rest, these pivot arms comprising heads pointing to the center of the clearance, the distance between the heads formed by stop means in the initial condition corresponding to the average onion cross-section in the area of the cut-off onion blossom, and the heads being provided with slitting knives located in the plane of rotation and stripper means extending approximately tangentially to the onion cross-section.

This arrangement makes it possible to set the blossom-free onion by a cross-section on the rest and to place the support plate with the pivot arms on the rest, the onion passing through the clearance in the support plate and the shape of the onion being capable in a way of assuming by itself the guidance of the heads at the pivot arms, whereby at the impinging of the heads on the onion body first the inwardly pointing slitting knives are incident on the onion body and cut the outer onion skin and, thereafter, following further depression of the support plate against the onion, the strippers engage the onion skin which they carry along beginning at the top and moving along the shape of the onion while the support plate moves further down, so that the onion is rid of its skin by a single motion, namely the descent of the support plate.

One possible arrangement of the knives and strippers is to mount the slitting knives and strippers on separate pivot arms, with alternation between the arms bearing the knives and those bearing the strippers.

However it is also found in surprising manner that it is possible to mount sequentially the slitting knives and strippers on the same head of a pivot arm, whereby the strippers from one head always seize two adjacent strips of onion skin which then are separated from each other by the knife. This arrangement too permits removing the onion skin in problem-free manner. This arrangement requires at least three equidistant pivot arms on the periphery.

Whether the strippers are mounted on a separate pivot arm or in combination with a slitting knife on a pivot arm, they may each comprise a tear-off edge with a cross-sectionally projecting tip to seize the onion skin. This tear-off edge in a further embodiment may be serrated to form tips to assure seizing the rim of the onion skin.

Because of the stripper, the pivot arm follows the contour of the onion, the tear-off edge dragging along the outer onion skin and resting on the next onion skin and preventing to this extent that the slitting knife penetrate the onion skins too deeply. Also, the depth of penetration of the knife depends of course on the spring force loading the pivot arms.

It is especially advantageous that the pivot arms be arcuate and subtend about a quarter of a circle because thereby the pivot arms are reliably kept from making contact with the onion to be peeled. To each pivot arm may be associated a separate bearing block mounted in the area of the lower end of the pivot arm on the support plate, the pivot arms being pivotable about an axis tangential to the onion diameter.

The support plate can be designed as a guide plate with grips on both sides and with a circular clearance at its center to pass the onion and to provide a rest for it. In such an embodiment the support plate can be held both sides at the grips and be guided vertically above the onion rest.

Another embodiment provides for the support plate being pivotably resting on a base plate in one side of the rest, so that the support plate is displaced in guided manner. To substantially exclude the otherwise resultant circular motion, a relatively long pivot arm for the support plate and a corresponding spacing between the onion rest and the pivot axis are provided.

Very advantageously the spring loading may be such that an annular spring, preferably a rubber ring overlapping all pivot arms is mounted in the lower area of the pivot arms and forces inward the lower ends of the pivot arms in the area of bearing blocks. Appropriately every pivot arm in this area is provided with an outwardly open groove receiving the spring or rubber ring.

Another embodiment consists in mounting a spring or rubber ring additionally or solely in the area of the heads, mutually attracting the heads and therefore the pivot arms.

This spring or rubber ring preferably can be rectangular or square in cross-section, one cross-sectional edge being so arranged as to grip the onion skin. Thereby the spring or rubber ring can support the strippers or replace them.

The spring or rubber ring should be of a physiologically unobjectionable material.

The onion rest mounted on the base plate may evince various designs in embodiment, attention merely being paid to holding the onion at its lower part in order to permit peeling.

An especially advantageous embodiment is achieved by impaling the onion on a vertically upward pointing taper which then will hold it, this taper ending in a seating pan fitted to the shape of the onion and on which the onion body can rest.

Appropriately the taper consists of flat strip of metal pointed at the top which can be coiled once or more to better hold the onion.

Where the above described combination of the pivot-arm heads is used, wherein the slitting knife and the wiper are mounted sequentially, it is found to be especially appropriate to use six pivot arms with heads of such a design.

In one embodiment using plastics, the pivot arms appropriately evince an H cross-section, the slitting knife being injection molded into the web of the H cross-section.

In this embodiment the stripper advantageously forms a terminal plate at the free end of the particular pivot arm, the plate projecting beyond the lower edge of the lower web of the H cross section in the downward direction.

BRIEF DESCRIPTION OF THE DRAWINGS

The invention is discussed below in closer detail and in relation to the embodiments of the drawing.

FIG. 1 is a sideview of the section I—I of FIG. 3 of an embodiment of the onion peeling device of the invention, FIG. 1a is a cross-sectional view of arm 3 of FIG. 1, FIG. 2 shows the associated onion rest, FIG. 3 is the topview of the arrangement of FIG. 1, FIG. 4 is an elevation similar to FIG. 1 but for a variational embodiment.

DESCRIPTION OF THE PREFERRED EMBODIMENTS

Figure 5:
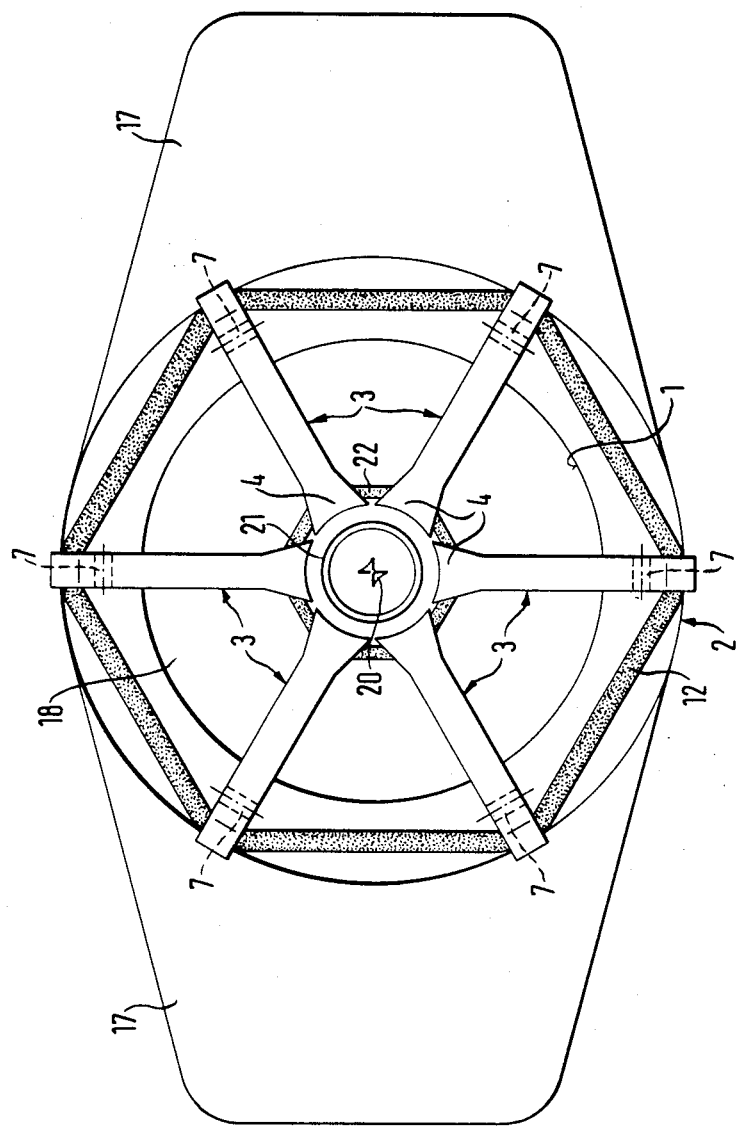
FIG. 5 is the top view of the arrangement of FIG. 4.

As shown in FIGS. 1 and 3, six pivot arms 3 are arranged on a support plate 2 provided with a circular clearance 1 (see FIG. 1), these arms being provided with heads 4 pointing to the center of the clearance 1, the spacing of the heads 4 when in the initial condition rendered by FIGS. 1 and 3 being determined by stop surfaces 5 in the area of the bearing blocks 6 at the lower ends of the pivot arms 3. The bearing blocks 6 are seated in the embodiment shown on an opposite surface of the support plate 2.

The pivot arms 3 pivot in the area of the bearing blocks 6 about their axes 7 (see FIG. 3), these axes 7 being tangential to the onion 8 (FIG. 2) or to its rest 9 (FIG. 2).

In the embodiment of FIGS. 1 and 3 the heads 4 are provided with slitting knives 10 located in the plane of rotation of the pivot arms 3, the slitting knives and the strippers 11 however being so arranged with respect to each other that first it is the slitting knives 10 which penetrate the onion. The strippers 11 include a downward pointing stripping edge 11a to assure that the onion skin slit open by the slitting knives 10 is seized. As shown in FIG. 1, the tear-off edges 11a may comprise serrations 11b or the like.

The pivot arms are mutually attracted by a spring or rubber ring 12 mounted in the lower area of the pivot arms 3 and pressing inward their lower ends 3a. To keep the spring or rubber ring 12 in place, the pivot arms are provided in this area with an outwardly open groove 13 seating the spring or rubber ring 12.

In the embodiment shown in FIG. 1a the pivot arms 3 evince an H cross-section with the slitting knife 10 inserted into the web 14 of the H cross-section. When the pivot arms are made of plastic, the slitting knife 10 is injection molded into the web 14.

The stripper 11 is formed in this embodiment by an end plate 15 of the free end of the particular pivot arm 3, the plate projecting downward above the lower edge of the lower foot 16 of the H cross-section.

The support plate 2 may include as shown grips 17 whereby it is held and by means of which it can be guided together with its clearance 1 above the rest 9 of an onion 8.

FIG. 2 shows an associated rest for an onion 8 consisting of a base plate 18, a tube 19 vertically mounted on this base plate and a taper 20 ending in a seating pan 21 fitted to the shape of the onion. The onion body rests on the seating pan.

In the embodiment shown in FIG. 2, the taper 20 consists of a flat strip of metal with a sharp tip and coiled to better hold the onion 8.

To peel the onion, it is therefore impaled on the taper 20 and then the support plate 2 is held at both grips 17 and guided with its clearance above the rest 9. In the process the onion moves coaxially through the circular clearance 1. The moment the heads 4 impinge on the onion 8, the slitting knives 10 enter the outer onion skin which they then slit, and upon further depression, the stripprs 11 are activated and take off the slitted skins.

Instead of the grips and the manual guidance thereby called for, the base plate 18 and the support plate 2 can be joined to each other by a linkage mounted to one side of both plates, provision being made to compensate the resultant circular motion by a relatively long pivot arm for the support plate and a corresponding spacing between the onion rest and the axis of rotation.

As regards the embodiments of FIGS. 4 and 5, a spring or rubber ring 22 is mounted in the area of the heads 4 whereby these heads 4 and hence the pivot arms 3 are mutually drawn together. This rubber ring 22 may be additional to the spring or rubber ring 12 or it may replace it.

The spring or rubber ring 22 has a rectangular or square cross-section, with a cross-sectional edge 23 being so arranged as to seize the onion skin and hence to support or replace the strippers 11.

I claim:

1. In an onion peeling apparatus having a holder for an onion having a cross-section, with pivot arms supported centrally on a support plate provided with a clearance, where said pivot arms are pulled toward each other by elastic means and comprise heads pointing toward the center of said clearance, stop means determining spacing between said heads and said heads provided with slitting knives located in a pivot plane, the improvement comprising:

said clearance being circular, at least three of said pivot arms (3) mounted around said circular clearance (1) whereby said heads are guided over said onion, said heads provided with strippers (11) extending tangentially to said cross-section of said onion and mounted on free ends of said heads beyond said slitting knives.

2. The apparatus of claim 1, wherein said slitting knives (10) and said strippers (11) are mounted to separate pivot arms (3), with alternation between the pivot arms (3) bearing the knives and those bearing the strippers.

3. The apparatus of claim 1, wherein said slitting knives (10) and said strippers (11) are mounted one behind the other always at the same head (4) of a pivot arm (3).

4. The apparatus of claim 1, wherein said strippers (11) each have a tear-off edge (11a) with a cross-sectionally projecting tip (11b).

5. The apparatus of claim 1, wherein said pivot arms (3) are bent in arcs of circle and subtend approximately a quarter circle.

6. The apparatus of claim 1, wherein said support plate (2) is a guide plate with grippers (17) on both sides and with said circular clearance (1) acting as a passage for said onion (8) and said holder (9) being located at the center of said guide plate.

7. The apparatus of claim 1, wherein said support plate (2) is pivotably supported by a relatively long pivot arm to one side of a base plate (18) comprising said holder (9).

8. The apparatus of claim 1, wherein said pivot arms having bearing block elastic means comprises an elastic ring (12) spanning all said pivot arms (3) mounted in the lower area of said pivot arms (3) and forcing inward lower ends (3a) of said pivot arms (3) in the vicinity of said bearing blocks (6).

9. The apparatus of claim 8 wherein said elastic ring (12) consists of rubber.

10. The apparatus of claim 8, wherein said pivot arms (3) are each provided in a lower section (3a) with an outwardly open groove (13) into which said elastic ring is secured.

11. The apparatus of claim 1, wherein an elastic ring (22) is mounted in the area of said heads (4) of said pivot arms (3) and draws together said heads (4) and hence said pivot arms (3).

12. The apparatus of claim 8, wherein an elastic ring (22) is mounted in the area of said heads (4) of said pivot arms (3) and draws together said heads (4) and hence said pivot arms (3).

13. The apparatus of claim 11, wherein said elastic ring (22) has a rectangular cross-section of which one edge (23) seizes the onion skin.

14. The apparatus of claim 12, wherein said elastic ring (22) has a rectangular cross-section of which one edge (23) seizes the onion skin.

15. The apparatus of claim 1, wherein said holder has an upward pointing taper (20) for supporting said onion vertically.

16. The apparatus of claim 15, wherein said taper (2) terminates in a receiving pan (21) fitted to the shape of the onion and acting as a rest for said onion.

17. The apparatus of claim 15, wherein said taper (20) consists of a tapered metal strip.

18. The apparatus of claim 17, wherein said taper includes a plurality of coils.

19. The apparatus of claim 1, wherein six peripherally equidistant pivot arms (3) are provided.

20. The apparatus of claim 1, wherein said pivot arms (3) are plastic and have an H cross-section.

21. The apparatus of claim 20, wherein said slitting knives (10) are injection-molded into the web (14) of said H cross-section.

22. The apparatus of claim 20, wherein said strippers are defined by terminal plates (15) on free ends of said pivot arms (3), said plates projecting downwardly beyond the lower edge of said lower web (16) of said H cross-section.

* * * * *